United States Patent
Bastien et al.

(10) Patent No.: US 6,832,795 B2
(45) Date of Patent: Dec. 21, 2004

(54) BUMPER ASSEMBLY

(75) Inventors: Christophe Bastien, Coventry (GB); Stephen Faithfull, Coventry (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,322

(22) Filed: Oct. 3, 2002

(65) Prior Publication Data
US 2003/0067178 A1 Apr. 10, 2003

(30) Foreign Application Priority Data
Oct. 6, 2001 (GB) .............................................. 0124052

(51) Int. Cl.⁷ .............................................. B60R 19/04
(52) U.S. Cl. ....................................... 293/120; 293/121
(58) Field of Search ................................ 293/120, 122, 293/121, 133, 132, 146

(56) References Cited

U.S. PATENT DOCUMENTS 3,884,516 A * 5/1975 Gallion et al. .............. 293/120
5,066,057 A * 11/1991 Furuta et al. ............... 293/121
5,711,562 A 1/1998 Terada et al.
6,435,577 B1 * 8/2002 Renault ...................... 293/120
6,513,843 B1 * 2/2003 Frederick et al. ........... 293/120

FOREIGN PATENT DOCUMENTS

| EP | 0761504 A |   | 3/1997 |         |
|----|-----------|---|--------|---------|
| EP | 1103428 A |   | 5/2001 |         |
| GB | 2134858 A |   | 8/1984 |         |
| GB | 2322602 A |   | 9/1998 |         |
| JP | 402204150 A | * | 8/1990 | ................ 293/117 |
| JP | 11208389 A |   | 8/1999 |         |

* cited by examiner

*Primary Examiner*—Jason Morrow
(74) *Attorney, Agent, or Firm*—Gigette M. Bejin

(57) ABSTRACT

A bumper assembly (10) including a support (16) which is covered by a resilient shell part (41), the lower portion of the shell part (41) being backed by foam material (14) mounted on the support (16), with the upper portion of the shell being unsupported having a clearance zone (43) therebehind. A registration plate plinth 44 has an upright limb (47) to which a number plate (45) is secured and is mounted on the shell so that the lower portion of said limb (47) is supportable on the foam (14) and its upper portion is supportable only by the shell (41).

11 Claims, 3 Drawing Sheets

BUMPER ASSEMBLY

BACKGROUND OF INVENTION

1. Field of Invention

This invention relates to a bumper assembly and in particular an assembly for use on motor vehicles in particular cars and vans.

2. Background of Invention

It is known that automobile bumpers should be designed to withstand small impact forces without damage, or at least minimum damage, occurring at low speeds. Typical low speeds occur during vehicle manoeuvering whilst parking. However, modern bumper assemblies must also be capable of offering protection to pedestrians when impacted by a slow moving vehicle.

A known bumper assembly which is claimed to alleviate pedestrian injury is disclosed in GB-A-2322 602 which provides a bumper assembly which comprises a plastic shell mounted on a support rail with the space between the shell and rail being substantially foam filled with different density foams. In one embodiment the upper portion of shell is hollow and collapses on initial impact onto the foam filling which creates an inclined face which is intended to guide a pedestrian onto the bonnet where it is believed that the pedestrian is in less danger of injury.

However many vehicles have a vehicle registration plate mounted on the front bumper assembly and a pedestrian friendly bumper assembly must also protect against injury from the number plate.

SUMMARY OF INVENTION

The present invention provides an improved vehicle bumper system with a pedestrian friendly vehicle registration plate assembly.

According to the present invention there is provided a bumper assembly comprising a support which is covered by a resilient shell part, the lower portion of the shell being backed by foam material mounted on the support, with the upper portion of the shell being unsupported having clearance therebehind, and a registration plate plinth having an upright limb to which the number plate is secured and which is attached to the shell with the lower portion of said limb supportable on said foam and the upper portion of said limb being supportable only by the shell.

The shell is preferably made from a polyolefinic material preferably from a polypropylene based material which may include EPDM rubber. The foam is preferably a polyurethane foam which in the area behind the plinth may have a density 60–80 gms per liter.

When a vehicle registration plate is mounted on the plinth and in the event of a collision with a pedestrian, since only the lower portion of the plinth limb is supported on the foam and the upper portion is supported on the deformable and collapsible shell, the plinth can move into the shell and tilt or rotate absorbing impact energy and supporting the lower leg of the pedestrian.

Preferably number plate plinth further comprises at least one reawardly extending portion which is attached to a substantially horizontal portion of the shell. The rearwardly extending portion(s) may be attached to the shell by a load sensitive device which allows the rearwardly extending portion to move rearwards relative to the shell under a predetermined minimum load. The upright limb comprises a plate having a top edge and the rearward portion(s) extend from a top edge substantially normal of the plate.

The plinth is attached to the shell by fastening members extending through the upright limp.

The bumper assembly may Include a hoop-like support means having a central aperture surrounded by an upper beam and a lower beam connected by outer side portions, and said support comprises the lower beam.

Any number plate on the plinth may extend downwardly beyond the plinth such that the upper portion of the number plate above the foam is not less than 50% of the overall height of the plate.

Preferably the upper beam is set backwards from the front surface of the foam on the lower beam such that a line connecting points on said upper beam and front surface makes an angle of inclination to the vertical of at least 12 degrees of arc and the plinth is mounted so that its rearwards extensions(s) are secured to part of the surrounding the aperture and the plate can tilt to at least said inclination.

The open centre of the support allows for a open centred bumper assembly which facilitates vehicle engine cooling.

The hoop-like support is preferably formed from a suitable thermoplastics plastics materials and is preferably formed from a polycarbonate based material, for example Xenoy (TM) available from General Electric.

The support and foam backing provides a support for said lower leg which is located in use at a height of about 260–270 mm above ground.

BRIEF DESCRIPTION OF DRAWINGS

The invention will be described by way of Example and with reference to the accompanying drawings in which.

DETAILED DESCRIPTION

Figure 1:
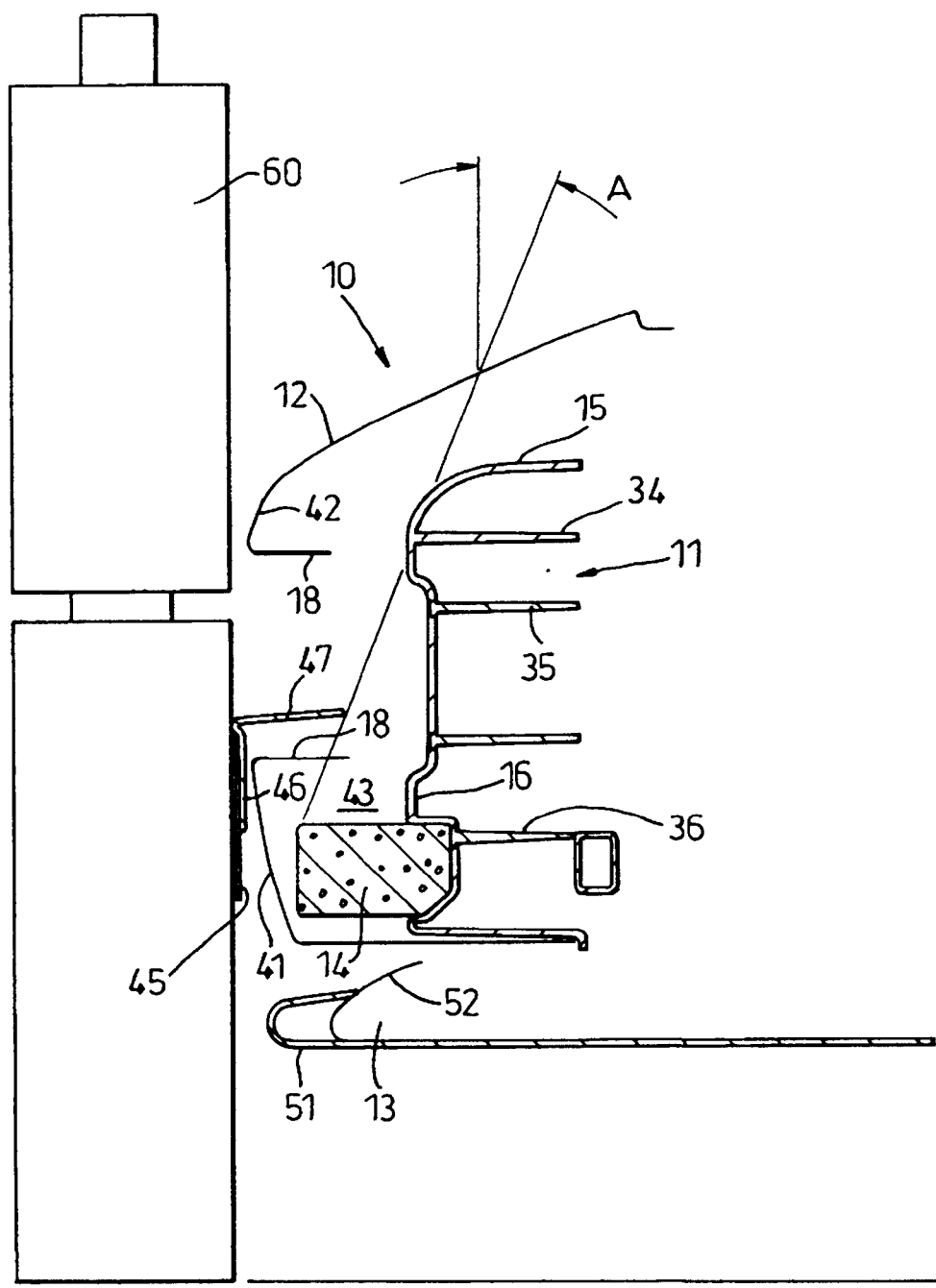
FIG. 1 is a cross-section of a bumper assembly according to the present invention taken on the vehicle longitudinal centreline.
Figure 2:
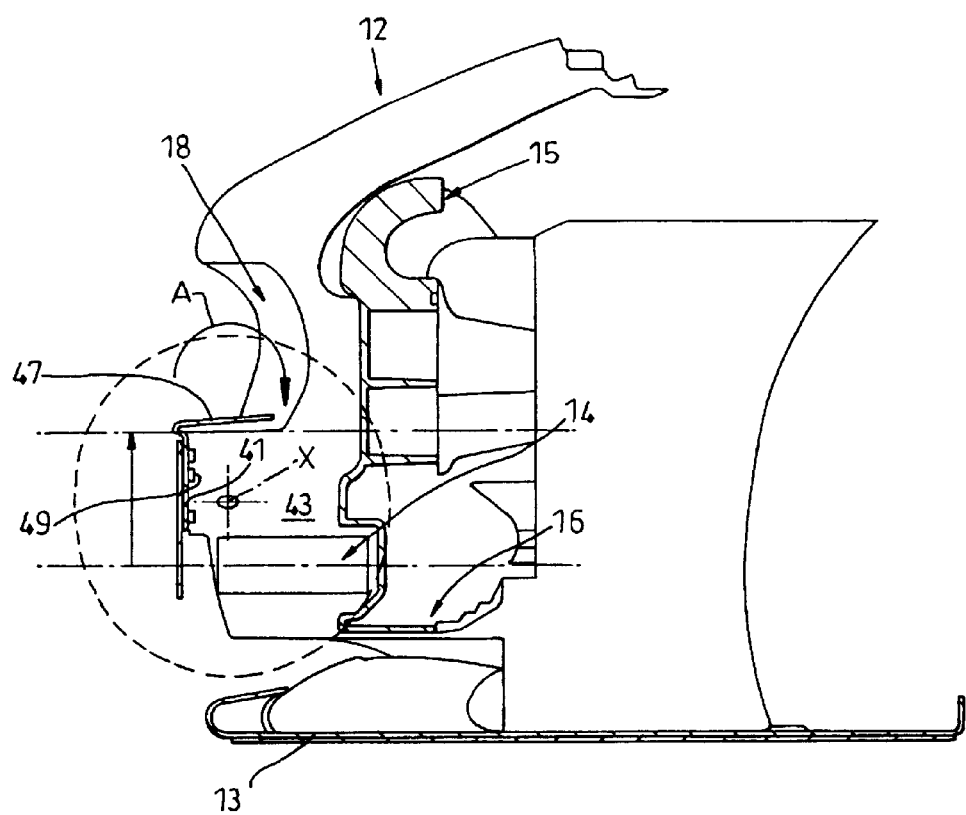
FIG. 2 is a cross-sectional view of the bumper assembly shown in FIG. 1.
Figure 3:
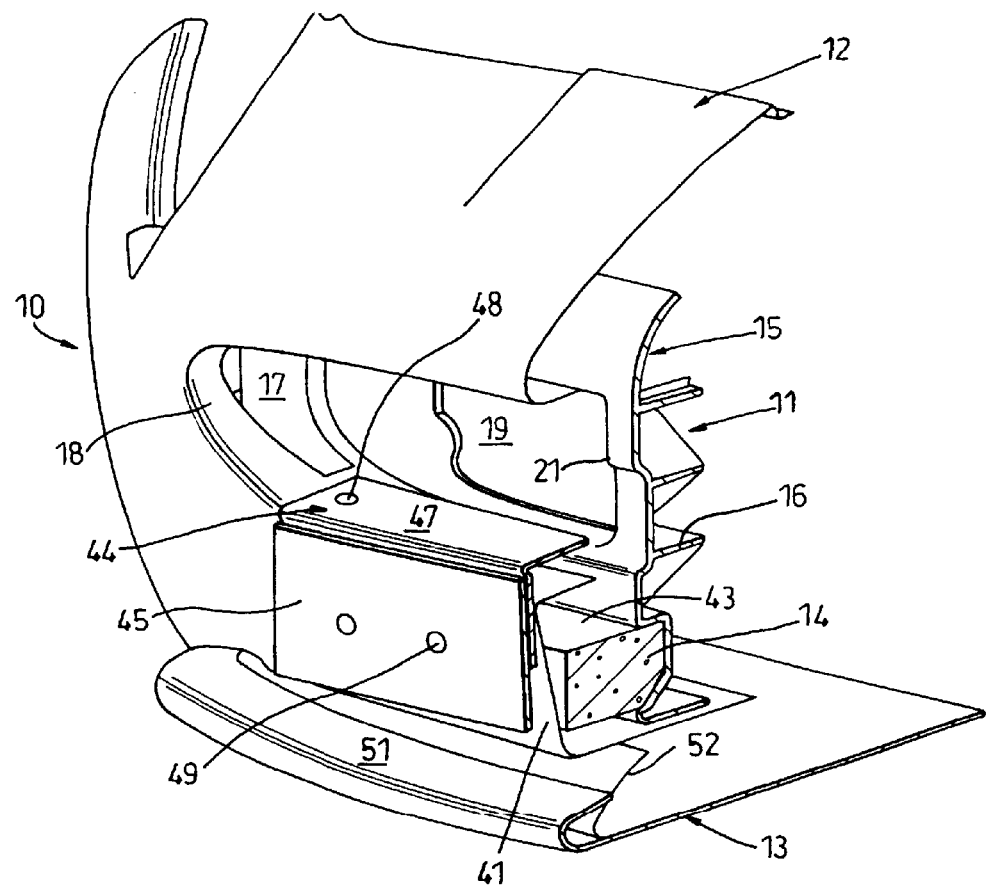
FIG. 3 is an isometric sectional view of the bumper assembly of FIG. 1.

With reference to FIGS. 1 to 3 there is shown a bumper assembly 10 friendly to pedestrians and which meets low speed impact requirements FMVSS581 and CMVSS215.

The bumper assembly comprises a hoop-like support means 11, a resilient cover or shell 12, an undertray 13 located beneath the support means 11, and foam 14. The hoop-like support means 11 is a relatively rigid structure comprising a moulding of a suitable polymeric material, preferably polycarbonate material an example of which is sold under the tradename Xenoy available from General Electric and sold as bumper composite material. The support means 11 is fixed to the vehicle body and comprises upper and lower beams 15 & 16 which extend across the width of the vehicle and are linked by side portions 17. The two beams 15 & 16 are spaced by about 250 mm and the two side portions are about 850 mm apart. The support means 11 has a central aperture 19 and is strengthened by a central rib 21 which interconnects the two beams 15 and 16.

The lower beam 16 forms a support for the foam 14 which comprises multi density foam, preferably a polyurethane foam, mounted on the front surface of the lower beam 16 and may be arranged with higher density foam in the central region and lower density foam at the outer regions. The rear surface of the support means 11 has strengthening ribs and flanges 34, 35, 36, for example, moulded therein.

The shell 12 is also hoop shaped to conform with the support means 11 and is moulded from a resilient thermoplastic material such as a polypropylene material which may include ethylene propylene rubber EPDM. The shell 12 is mounted to parts of the vehicle structure body such as the fenders and slam panel. The shell has a bottom cover 41 covering the lower beam 16 and top cover 42 covering the upper beam 15. The lower portion of the bottom cover 41 is backed by the foam 14 mounted on the lower beam 16 and the upper portion of the cover 42 has a clearance zone 43 to its rear. In an alternative arrangement (not shown) the shell 12 may be mounted on the support 11.

The undertray 13 comprises a resilient polypropylene cover 51 mounted on a relatively rigid support 52 fixed to the vehicle structure and on impact the cover 51 may ride up the sloping front of support 52 and absorb some of impact energy.

A plinth 44 for a vehicle registration plate 45 is attached to the central portion of the bottom cover 41. The plinth 44 comprises a front plate 46 which in use is substantially vertical with rearwardly extending flange 47 projecting substantially normally from its upper edge. The flange 47 is fixed at its outer ends to portions 18 of the cover 12 surrounding the aperture 19 by fastenings 48. The fastenings may be in the form of rivets, straps, clips, hooks etc. which can allow the flange 47 to detach from the cover 12 when placed under a predetermined load. The front plate may also be secured to the bottom cover 41 by fasteners and registration plate 45 is attached to the vertical front plate 46 by suitable fasteners 49.

The front plate 46 has its lower portion supported on the cover 12 and foam 14, whereas its upper portion is supported only by the cover 12 which has a clearance zone 43 therebehind.

A pedestrian leg is represented by the column 60 and the foam 14 on the lower beam is arranged so that its centre is at a height of about 260–270 mm above the ground, that is ideally just below the centre of gravity of a typical tibia. On impact against the registration plate 45, the plinth 44 is first pushed rearwardly and may break the fastenings 48 holding the rearward extensions 47 to the cover. Further movement is resisted by the foam 14 at the lower portion of the plinth, but the upper portion meets only low resistance as the cover deforms and collapses. The plinth rotates in the direction of arrow A around an axis X and sinks into the cover 12. This absorbs some impact energy.

The undertray 13 is arranged at a height above the ground of 220–230 mm and is substantially in alignment with the lower cover 41 of the shell. The top beam 15 is set back from the front of the foam 14, for a higher density foam, by about 80 mm such that a line passing through the front face of the foam 14 and the front of the upper beam 15 subtends an angle A to the vertical of at least 12 degrees of arc. This angle may be increased for the use of lower density foams on the lower beam 16.

In an impact with a pedestrian, the upper shelf 12 is resiliently collapsible onto the upper beam 15, the registration plate and plinth tilt and rotate, and the lower shell will be supported by foam 14 which will crush, and the cover 51 will be resiliently pushed against the undertray 13. The movement of the plinth and the undertray 13 helps prevent the leg from passing under the vehicle. The stored energy in the deformed cover 12 and foam behind registration plate plinth together with the collapsing upper cover 42 will tend to tip the pedestrian onto the bonnet of the vehicle. The use of the rotatable plinth 44 provides an improved deceleration of the lower leg reducing the leg bend angle and shear displacement of the leg.

What is claimed is:

1. A bumper assembly comprising:
   a support which is covered by a resilient shell part, a lower portion of the shell being backed by foam material mounted on the support, with an upper portion of the shell being unsupported having clearance therebehind, and
   a registration plate plinth having an upright limb to which a number plate is capable of being secured to and which is mounted on the shell so that the lower portion of said limb is supportable by said foam and the upper portion of said limb is supportable only by the shell.

2. A bumper assembly as claimed in claim 1 wherein the registration plate plinth further comprises at least one rearwardly extending portion which is attached to a substantially horizontal portion of the shell.

3. A bumper assembly as claimed in claim 2 wherein the rearwardly extending portion is attached to the shell by a load sensitive device which allows the rearwardly extending portion to move rearwards relative to the shell under a predetermined minimum load.

4. A bumper assembly as claimed in any one of claims 1 to 3 wherein the upright limb comprises a plate having a top edge and a rearward portion extends from a top edge substantially normal of the plate.

5. A bumper assembly in claim 1 wherein the registration plate plinth is attached to the shell by fastening members extending through the upright limb.

6. A bumper assembly as claimed in claim 1 wherein the bumper assembly includes a hoop-like support means having a central aperture surrounded by an upper beam and a lower beam connected by outer side portions, and said support comprises the lower beam.

7. A bumper assembly as in claim 1 further comprising a number plate fixed to the upright limb of the support.

8. A bumper assembly as claimed in claim 7 wherein the number plate extends downwardly beyond the registration plate plinth.

9. A bumper assembly as claimed in claim 7 wherein a portion of the number plate supported on the foam does not exceed 50% of the height of the plate measured from its lower edge.

10. A bumper assembly as claimed in claim 6 wherein the upper beam is set backwards from a front surface of the foam on the lower beam such that a line connecting points on said upper beam and front surface makes an angle of inclination to the vertical of at least 12 degrees of arc and the registration plate plinth can tilt to at least the same inclination.

11. A motor car having a bumper assembly as claimed in claim 1.

* * * * *